United States Patent [19]

Ashby

[11] Patent Number: 4,460,739
[45] Date of Patent: Jul. 17, 1984

[54] COMPOSITION FOR PROMOTING ADHESION OF CURABLE SILICONES TO SUBSTRATES

[75] Inventor: Bruce A. Ashby, Schenectady, N.Y.

[73] Assignee: General Electric Company, Schenectady, N.Y.

[21] Appl. No.: 510,341

[22] Filed: Jul. 1, 1983

[51] Int. Cl.³ .......................................... C08K 11/00
[52] U.S. Cl. .................................. 524/702; 525/474;
524/703; 524/783; 524/785; 524/788; 524/789;
524/864; 524/730; 524/865; 528/14; 528/15;
528/16; 528/18; 528/19; 528/33; 528/34;
427/387; 428/447
[58] Field of Search ............... 528/14, 15, 16, 18,
528/19, 33, 34; 524/702, 703, 783, 785, 788,
789, 864, 865, 730; 525/474; 427/387; 428/447

[56] References Cited

U.S. PATENT DOCUMENTS

| | | | |
|---|---|---|---|
| 2,938,009 | 5/1960 | Lucas | 260/37 |
| 3,004,859 | 10/1961 | Lichtenwalner | 106/308 |
| 3,035,016 | 5/1962 | Bruner | 260/46.5 |
| 3,065,194 | 11/1962 | Nietzche et al. | 260/37 |
| 3,122,522 | 2/1964 | Brown et al. | 260/46.5 |
| 3,133,891 | 5/1964 | Ceyzeriat | 260/18 |
| 3,161,614 | 12/1964 | Brown et al. | 260/46.5 |
| 3,170,894 | 2/1965 | Brown et al. | 260/46.5 |
| 3,175,993 | 3/1965 | Weyenberg | 260/46.5 |
| 3,220,972 | 11/1965 | Lamoreaux | 260/46.5 |
| 3,294,739 | 12/1966 | Weyenberg | 260/46.5 |
| 3,296,161 | 1/1967 | Kulpa | 260/18 |
| 3,334,067 | 8/1967 | Weyenberg | 260/46.5 |
| 3,382,205 | 5/1968 | Beers | 260/37 |
| 3,383,355 | 5/1968 | Cooper | 260/46.5 |
| 3,438,930 | 4/1969 | Beers | 260/37 |
| 3,499,859 | 3/1970 | Matherly | 260/37 |
| 3,517,001 | 6/1970 | Berger | 260/248 |
| 3,542,901 | 11/1970 | Cooper et al. | 260/825 |
| 3,635,743 | 1/1972 | Smith | 106/288 Q |
| 3,700,714 | 10/1972 | Hamilton et al. | 260/448.2 B |
| 3,708,467 | 1/1973 | Smith et al. | 260/185 |
| 3,719,635 | 3/1973 | Clark et al. | 260/46.5 G |
| 3,775,452 | 11/1973 | Karstedt | 260/429 R |
| 3,779,986 | 12/1973 | Smith et al. | 260/46.5 G |
| 4,036,813 | 7/1977 | Hardman et al. | 260/46.5 G |
| 4,100,129 | 7/1978 | Beers | 260/37 SB |
| 4,180,642 | 12/1979 | Takago | 528/32 |
| 4,248,993 | 2/1981 | Takago | 528/38 |
| 4,257,932 | 3/1981 | Beers | 260/18 S |

Primary Examiner—Melvyn I. Marquis
Attorney, Agent, or Firm—Hedman, Gibson, Costigan & Hoare

[57] ABSTRACT

The adhesion of self-bonding, low modulus, one package, room temperature vulcanizable silicone compositions to a variety of substrates is effectively promoted by incorporation in the silicon composition, before curing, of a small effective amount of an adhesion promoting composition comprising at least one maleamidylalkyltrialkoxysilane or maleamidylalkyltriacyloxysilane compound of the formula:

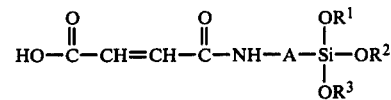

wherein A is divalent alkylene of from 2 to 6 carbon atoms and $R^1$, $R^2$ and $R^3$ are, independently, $C_1$-$C_6$ alkyl or $C_2$-$C_6$ alkanoyl.

27 Claims, No Drawings

COMPOSITION FOR PROMOTING ADHESION OF CURABLE SILICONES TO SUBSTRATES

BACKGROUND OF THE INVENTION

The present invention relates to curable silicone rubber compositions. More particularly, it relates to self-bonding, one package, room temperature vulcanizing (RTV) compositions of a silanol chain-stopped diorganopolysiloxane, a highly functional hydroxy-reactive silane crosslinking agent, a crosslinking catalyst and an adhesion promoter, which exhibit improved adhesion to a variety of substrates.

Room temperature vulcanizing silicone compositions are presently widely known. For example, Nietzche and Wick in U.S. Pat. No. 3,065,194, disclose a family of silicone rubber compositions comprising an essentially anhydrous mixture of (1) a linear organosiloxane polymer having hydroxyl terminal groups, (2) a polyfunctional organosilicone crosslinking agent, and (3) a metal salt, chelate, organometallic compound, acid or base, which serves as a crosslinking catalyst. These compositions vulcanize or cure to rubbery solids when exposed to moisture. The compositions are extremely useful because they can be maintained for extended periods of time in a single container ready for use, e.g., sealed in caulking tubes. The user may then apply the material to a substrate and simply bring it into contact with water or water vapor to cure it. The compositions are useful as sealants, electrical insulation, coatings, dental cement, caulking compounds, expansion joints, gaskets, shock absorbers, adhesives and in many other applications.

Other one package room temperature vulcanizing silicone compositions are described in Bruner, U.S. Pat. No. 3,035,016 and Ceyzeriat, U.S. Pat. No. 3,133,891, which deal with one package compositions comprising the reaction products of acyloxy-substituted silanes and hydroxylated siloxanes. The compositions cure with the liberation of acid fragments and curing may be promoted with various agents, such as organic derivatives of tin. Also of interest is U.S. Pat. No. 3,164,614, to Brown et al., which discloses compositions of a pretreated silanol end-stopped diorganopolysiloxane and crosslinker in combination with a crosslinking catalyst. Cooper, in U.S. Pat. No. 3,383,355, describes the preparation of an alkoxy-terminated linear siloxane polymer using a neutral, finely-divided solid catalyst, such as fuller's earth. A moisture curable RTV composition which includes a hydrocarbonoxy end-blocked diorganopolysiloxane and a metal-containing curing catalyst together with boron nitride is described in U.S. Pat. No. 3,499,859.

Still another composition is described by Cooper et al. in U.S. Pat. No. 3,542,901 which comprises a mixture of a linear siloxane having di- or tri-functional end-blocking units with a linear siloxane having chemically non-functional inert end-blocking units on one end and di- or tri-functional end-blocking units on the other end, and further including a catalyst and crosslinker. Additionally of interest are: Brown et al., U.S. Pat. No. 3,122,522, who combine organopolysiloxane intermediates containing considerable "cellosolvoxy" groups with a catalyst; Brown et al., U.S. Pat. No. 3,170,894, who combine organopolysiloxane intermediates containing condensable polyhydrocarbonoxy type radicals with a catalyst; and Weyenberg, U.S. Pat. No. 3,175,993, who combines organopolysiloxane intermediates end-blocked with alkoxylated silcarbonate groups with a catalyst.

Still other moisture curable one package RTV silicone compositions are disclosed in U.S. Pat. No. 3,689,454; 3,779,986; 3,334,067; and 3,719,635.

Another composition of particular interest is disclosed by Beers in U.S. Pat. No. 4,100,129, assigned to the same assignee as the present invention. In U.S. Pat. No. 4,100,129 compositions are disclosed comprising: 100 parts by weight of a silanol chain-stopped polydiorganosiloxane; from 0.01 to 5.0 parts by weight of a crosslinking silane of the formula:

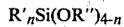

$$R'_n Si(OR'')_{4-n}$$

wherein R' and R" are each, independently, organic radicals of up to 8 carbon atoms selected from hydrocarbyl, halohydrocarbyl and cyano lower alkyl and n has a value of 0 to 3 and an average value based on the total amount of silane in the composition of 0 to 1.99; and from 0.10 to 10 parts by weight of a silanol reactive organometallic ester compound, wherein the weight of the organometallic ester compound to the cross-linking silane is always greater than 0.5 and preferably greater than 1.0. If compositions are prepared from the above-described ingredients in the specified ratios, a self-bonding, low modulus room temperature vulcanizing silicone composition is obtained which exhibits a very advantageous tensile and elongation relationship, i.e., low tensile and exceptionally high elongation, and in addition exhibits good adhesion to troublesome substrates.

These compositions are described as stable, which means that each forms a moisture curable mixture capable of remaining substantially unchanged while excluded from atmospheric moisture and which cures to a tack-free elastomer after an extended shelf period. In addition, a stable RTV also means that the tack-free time exhibited by freshly mixed RTV ingredients under atmospheric conditions will be substantially the same as that exhibited by the same mixture of ingredients exposed to atmospheric moisture after having been held in a moisture resistant and moisture-free container for an extended shelf period at ambient conditions, or an equivalent period based on accelerated aging at an elevated temperature.

Although many of the prior art moisture-curable, one package room temperature vulcanizing compositions have been very useful in different applications, there is still room for improvement. For example, the benefits provided by these compositions and the areas of application could be extended if the adhesion of the compositions to various substrates at room temperature and other temperature could be improved.

In the past, attempts to improve the adhesion of RTV silicone compositions to hard-to-bond substrates, such as metallic and thermoplastic surfaces, have generally fallen into three categories, i.e., treating the substrate with a primer material; using an adhesive composition to bond the silicone composition to the substrate; and lastly, incorporating adhesion-promoting additives in the RTV silicone composition itself. Of these three techniques, only the incorporation of additives provides a single step, single package product which is clearly the most demanded, useful and versatile.

In the prior art several different compounds have been added to RTV silicone compositions to improve their adhesion to substrates. For example, Kulpa, in U.S. Pat. No. 3,296,161 discloses that the addition of a dialkoxydiacyloxy silane having the formula $(RO)_2$-$Si(OY)_2$ wherein R is a lower alkyl radical and Y is a saturated aliphatic monacyl radical of a carboxylic acid, to an RTV silicone composition comprising (a) a liquid organopolysiloxane containing from 0.02 to 2.0% by weight silicone bonded hydroxyl groups; (b) an organotriacyloxysilane; and (c) a carboxylic acid metal salt as a cure accelerator provides a product which exhibits improved adhesion to stainless steel and aluminum, as well as to surfaces such as glass and acrylic resins. In U.S. Pat. No. 3,438,930 to Beers, it is disclosed that improved adhesion may result if a proper crosslinking silane is selected. More particularly, compositions comprising the reaction product of (a) a hydrolyzable silane of the formula:

wherein Y is a hydrolyzable radical and R is selected from monovalent hydrocarbon radicals, halogenated monovalent hydrocarbon radicals, and $R'_3CO$ radicals and R' is an alkyl radical and (b) an organopolysiloxane polymer terminated with a mixture of silanol radicals and tert-alkoxy radicals are described as exhibiting superior toughness and adhesion to a variety of unprimed substrates. Additionally, Hamilton et al. in U.S. Pat. No. 3,700,714, disclose that acetodialkenyl substituted silanes are useful adhesion promoting crosslinking agents for silanol chain-stopped diorganopolysilanes. More particularly, Hamilton, et al. disclose that silanes having one or more tert-alkoxy groups as silicone substituents, for example, di-ti-butoxy-diacetoxysilane, are effective adhesion promoters especially when bonding RTV compositions to substrates which are normally covered with an oxide film, such as aluminum.

Another useful family of adhesion promoting additives for room temperature vulcanizable silicone compositions is described by Berger in U.S. Pat. No. 3,516,001. The members of this family comprise the silicon-substituted isocyanurates known as mono-, di- and trisilylisocyanurates, of the formula:

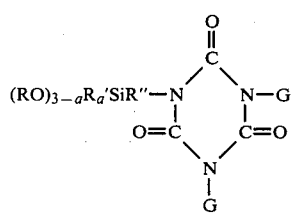

where R is an alkyl radical having from 1 to 8 carbon atoms, R' is a member selected from monovalent saturated hydrocarbon radicals, R" is selected from divalent saturated hydrocarbon radicals and halogenated divalent saturated hydrocarbon radicals, G is selected from R' radicals, $(RO)_{3-a}$-$R'_a$-Si-R" radicals, aliphatically unsaturated monovalent hydrocarbon radicals, and halogenated hydrocarbon radicals and a is a whole number equal to 0 to 3, inclusive. Examples of preferred adhesion promoters from the above-described compounds are 1,3,5-tris-trimethoxysilylpropylisocyanurate and bis-trimethoxysilylpropylisocyanurate.

Still another adhesion promoting additive useful in those applications where the RTV composition is to be bonded to a metal substrate is described in U.S. Pat. No. 3,719,635 to Clark et al. As disclosed therein, adhesion is promoted by the addition of from 0.01 to 2 parts by weight of a metal in the form of a metal hydrocarbonoxide selected from the group consisting of $Fe(OR')_3$, $V(OR")_3$, $Co(OR")_2$, $MoO_2(OR")_2$; $Zn(OR")_2$; $Ce(OR")_3$ and $Al(OCH_2CH_3)_3$ wherein R' is selected from ethyl, normal propyl, normal butyl, and phenyl and R" is selected from ethyl, normal propyl and normal butyl.

Perhaps the most effective and widely used adhesion promoting additives, aside from the silylisocyanurates disclosed by Berger above, are the carbamates and allophanates used and prepared in accordance with the teachings of Hardman et al., U.S. Pat. No. 4,036,813. As described therein useful adhesion promoters are provided in the form of a compound of the formula:

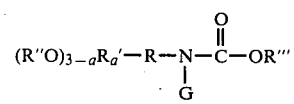

wherein G is hydrogen or a group of the formula:

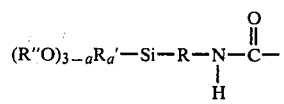

and R is divalent radical selected from alkylenearylene, alkylene, cycloalkylene of up to 8 carbon atoms, R' and R'", independently, are radicals of up to 8 carbon atoms selected from hydrocarbyl or halohydrocarbyl, R" is a radical of up to 8 carbon atoms selected from hydrocarbyl, halohydrocarbyl or cyanohydrocarbyl and a is 0 to 3, or mixtures of such compounds. Although, these adhesion promoting additives have proved to be effective, they are very expensive to use. The need for a low cost, adhesion promoting additive for low modulus curable silicone compositions still exists.

Mention should be made of glycidoxypropyltrimethoxylsilane, which Beers discloses to be still another useful adhesion promoting additive for RTV silicone compositions in U.S. Pat. No. 4,257,932.

Finally, it has recently been disclosed by Surprenant in copending U.S. Ser. No. 424,268 filed Sept. 27, 1982 that effective adhesion promoter compounds for room temperature vulcanizable silicone compositions comprise certain diorganocyclopolysiloxane compounds.

Each of the above-cited patents and applications are specifically incorporated herein by reference.

It has now been discovered that the adhesion of moisture curable, one package, low modulus, room temperature vulcanizing silicone compositions to hard to bond substrates is effectively improved by the addition of at least one maleamidylalkyl-trialkoxy or triacyloxy-silane compound. These additives may be prepared and used at a lower cost than the prior art isocyanurate adhesion promoters, and their carbamate and allophanate derivatives, and exhibit at least as good adhesion to a variety of substrates. In fact, the RTV silicone compositions incorporating the new and improved adhesion promoters of the subject invention exhibit satisfactory adhesion to both stainless steel and polymethylmethacrylate, substrates which are known to be the most difficult on which to obtain unprimed adhesion with RTV silicone compositions.

SUMMARY OF THE INVENTION

In accordance with these and many other objects, the present invention provides new and improved self-bonding low modulus, one package room temperature vulcanizable silicone compositions exhibiting superior adhesion to substrates comprising:
  (a) a silanol chain-stopped polydiorganosiloxane;
  (b) a silane or polysilane crosslinker therefor;
  (c) a catalyst capable of promoting the reactions between (a) and (b); and
  (d) a small, effective, adhesion promoting amount of an adhesion promoter composition comprising at least one compound of the formula:

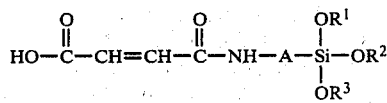

wherein A is a divalent alkylene of from 2 to 6 carbon atoms and $R^1$, $R^2$ and $R^3$ are, independently, $C_1$–$C_6$ alkyl or $C_2$–$C_6$ alkanoyl.

The new and improved adhesion promoting additives of the subject invention generally may be incorporated into any room temperature vulcanizable silicone composition. The above formulation is offered as a representative of such compositions and will be employed in the description of the invention for illustative purposes only and should not be construed as a limitation.

The preferred adhesion promoting additive of the subject invention is maleamidylpropyltriethoxysilane. The adhesion promoting additives may be prepared by reacting the corresponding aminoalkenyltrialkoxy- or acyloxy silane with maleic anhydride in a 50% by weight solution of a lower alkanol. The adhesion promoters of the subject invention are generally incorporated into RTV silicone compositions in small effective amounts of from 0.1 to about 15% by weight based upon the diorganopolysiloxane base polymer, and amounts of from 0.2% to about 2.0% by weight of the overall composition are generally preferred.

One preferred embodiment of a new and improved one package room temperature vulcanizable silicone composition curable in the presence of moisture to a self-bonding, low modulus, elastic solid which exhibits superior adhesion to substrates within the scope of the present invention is provided by a composition comprising:
  (a) 100 parts by weight of a silanol chain-stopped polydiorganosiloxane of the formula:

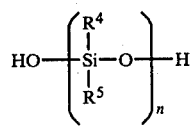

wherein $R^4$ and $R^5$ are each, independently, organic radicals of up to 8 carbon atoms selected from hydrocarbyl, halohydrocarbyl and cyano lower alkyl and n is an average number of from about 10 to 15,000;
  (b) from 0.01 to 5.0, preferably, 0.1 to 0.95 parts by weight of a cross-linking silane of the formula:

$$R^6{}_m Si(OR^7)_{4-m}$$

wherein $R^6$ and $R^7$ are the same as defined for $R^4$ and $R^5$ hereinabove and m has a value of 0 to 3 and an average value based on the total amount of silane in the composition of 0 to 1.99;
  (c) from 0.1 to 10 parts by weight of a silanol reactive organometallic ester compound of a metal, the compound having radicals attached to the metal atom, at least one of said radicals being a hydrocarbonoxy radical or a substituted hydrocarbonoxy radical, said radicals being attached to the metal atoms through M-O-R linkages wherein M is the metal and any remaining valences of the metal are satisfied by substituents selected from organic radicals which are attached to the atom through M-O-C linkages, —OH and —O— of a M-O-M linkage, the weight ratio of component (c) to (b) always being greater than 0.5 to 1, and preferably greater than unity;
  (d) from about 10 to 250 parts by weight of a filler per 100 parts of component (a) selected from the group consisting of calcium carbonate, fumed silica, and mixtures of the two; and
  (e) from about 0.2 to 2 parts by weight of an adhesion promoter composition per 100 parts of component (a), said adhesion promoting composition comprising at least one compound of the formula:

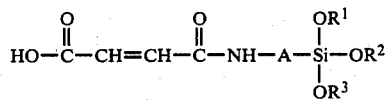

wherein A is a divalent alkylene of from 2 to 6 carbon atoms and $R^1$, $R^2$ and $R^3$ are, independently, $C_1$–$C_6$ alkyl or $C_2$–$C_6$ alkanoyl.

According to a further aspect of this invention, there is provided a method of preparing a rubbery adhesive material which comprises preparing a curable silicone composition as described above under substantially anhydrous conditions, and thereafter exposing the composition to moisture until it cures to a rubbery material. In accordance with still further aspects of the present invention, there are provided articles of manufacture comprising a plurality of workpieces having at least a part of surface portion of at least one workpiece disposed in close proximity to at least one other workpiece and having an adhesive joint therebetween being formed of a composition as defined in any one of the embodiments described above, as well as, a method for bonding articles to produce such articles of manufacture.

The new and improved room temperature vulcanizable silicone compositions incorporating the new and improved adhesion promoters of this invention are cheaper to produce and use than prior art compositions and exhibit very satisfactory adhesion to substrates of wood, glass, masonry, ceramics, metals and plastics.

Other advantages of the subject invention will become apparent from the following detailed description and examples.

DETAILED DESCRIPTION OF THE INVENTION

The new and improved self-bonding, low modulus, one package, room temperature vulcanizable silicone compositions of the subject invention may firstly comprise a silanol chain-stopped diorganopolysiloxane as component (a). The silanol chain-stopped diorganopolysiloxanes for use in the subject invention are represented by the formula:

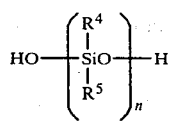

wherein $R^4$ and $R^5$ are each organic radicals of up to 20, and preferably up to 8 carbon atoms, selected from hydrocarbyl, halohydrocarbyl and cyano lower alkyl and n is a number that varies generally from about 10 to 15,000, preferably from 100 to 3,000, and more preferably from 300 to 1,500.

The silanol chain-stopped polydiorganosiloxanes are well known in the art, for example they may be prepared as described in Beers, U.S. Pat. No. 3,382,205, and include compositions containing different $R^4$ and $R^5$ groups. For example, the $R^4$ groups can be methyl, while the $R^5$ groups can be phenyl and/or beta-cyanoethyl. Furthermore, within the scope of the definition of polydiorganosiloxanes useful in this invention are copolymers of various types of diorganosiloxane units, such as silanol chain-stopped copolymers of dimethylsiloxane units, diphenylsiloxane units, and methylphenylsiloxane units, or, for example copolymers of dimethylsiloxane units, methylphenylsiloxane units and methylvinyl siloxane units. Preferably, at least 50% of the $R^4$ and $R^5$ groups of the silanol chain-stopped polydiorganosiloxanes are alkyl, e.g., methyl groups.

In the above formula, $R^4$ and $R^5$ can be, for example, mononuclear aryl, such as phenyl, benzyl, tolyl, phenylethyl, xylyl and ethylphenyl; halogen-substituted mononuclear aryl, such as 2,6-dichlorophenyl, 4-bromophenyl, 2,5-difluorophenyl, 2,4,6-trichlorophenyl and 2,5-dibromophenyl; alkyl such as methyl, ethyl, n-propyl, isopropyl, n-butyl, secbutyl, isobutyl, tertbutyl, amyl, hexyl, heptyl, octyl; alkenyl such as vinyl, allyl, n-butenyl-1, n-butenyl-2, n-pentenyl-2, n-hexenyl-2, 2,3-dimethylbutenyl-2, n-heptenyl; alkynyl such as propargyl, 2-butynyl; haloalkyl such as chloromethyl, iodomethyl, bromomethyl, fluoromethyl, chloroethyl, iodoethyl, bromoethyl, fluoroethyl, trichloromethyl, diiodoethyl, tribromomethyl, trifluoromethyl, dichloroethyl, chloro-n-propyl, bromo-n-propyl, iodoisopropyl, bromo-n-butyl, bromo-tert-butyl, 1,3,3-trichlorobutyl, 1,3,3-tribromobutyl, chloropentyl, bromopentyl, 2,3-dichloropentyl, 3,3-dibromopentyl, chlorohexyl, 1,4-dichlorohexyl, 3,3-dibromohexyl, bromooctyl; haloalkenyl such as chlorovinyl, bromovinyl, chloroallyl, bromoallyl, 3-chloro-n-butenyl-1, 3-chloro-n-pentyl-1, 3-fluoro-n-heptenyl-1, 1,3,3-trichloro-n-heptenyl-5, 1,3,5-trichloro-n-octenyl-6, 2,3,3-trichloromethylpentenyl-4; haloalkynyl such as chloropropargyl, bromopropargyl; cycloalkyl; cycloalkenyl and alkyl and halogen substituted cycloalkyl and cycloalkenyl such as cyclopentyl, cyclohexyl, cycloheptyl, cyclooctyl, 6-methylcyclohexyl, 3,3-dichlorocyclohexyl, 2,6-dibromocycloheptyl, 1-cyclopentenyl, 3-methyl-1-cyclopentenyl, 3,4-dimethyl-1-cyclopentenyl, 5-methyl-5-cyclopentenyl, 3,4-dichloro-5-cyclopentenyl, 5-(tert-butyl)1-cyclopentenyl, 1-cyclohexenyl, 3-methyl-1-cyclohexenyl, 3,4-dimethyl-1-cyclohexenyl; and cyano lower alkyl such as cyanomethyl, beta-cyanoethyl, gamma-cyanopropyl, delta-cyanobutyl, and gamma-cyanoisobutyl.

A mixture of various silanol chain-stopped polydiorganosiloxanes also may be employed. The silanol chain-stopped materials useful in the RTV compositions of this invention have been described as polydiorganosiloxanes but such materials can also contain minor amounts, e.g., up to about 20% of monoorganosiloxane units such as monosiloxane units, e.g., monomethylsiloxane units and monophenylsiloxane units. See, for example, Beers, U.S. Pat. Nos. 3,382,205 and 3,438,930, which are incorporated herein by reference.

The silanol chain-stopped polydiorganosiloxanes employed in the practice of the present invention may vary from low viscosity thin fluids to viscous gums, depending on the value of n and the nature of the particular organic groups represented by $R^4$ and $R^5$.

The viscosity of component (a) can vary broadly, e.g., in the range of 30 to 10,000 cps at 25° C. Preferably, it will be in the range of 1,000 to 200,000 cps, and especially preferably, from about 2,000 to about 30,000 cps at 25° C.

The tri- or tetrafunctional, hydroxy reactive silane crosslinker component (b) for use in the present invention may be generally represented by the formula:

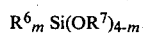

wherein $R^6$ is an organic radical of up to 8 carbon atoms selected from hydrocarbyl, halohydrocarbyl and cyano lower alkyl and $R^7$ is an organic radical of 1 to 30 carbon atoms selected from hydrocarbyl, halohydrocarbyl, hydrocarboyl and halohydrocarboyl and m has a value of 0 to 3 and preferably 0 to 1.

Illustrative organotrialkoxy silanes useful as crosslinkers in the subject invention include:

CH₃Si(OCH₃)₃
CH₃Si(OCH₂CH₃)₃
(CH₃)₂Si(OCH₃)₂
(CH₃)₃SiOCH₃

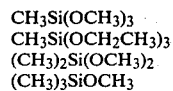

Si(OCH₃)₄
CH₃CH₂CH₂CH₂CH₂CH₂CH₂CH₂Si(OCH₃)₃
CF₃CH₂Si(OCH₃)₃
(CH₃)Si(OCH₂CH₂CH₂CH₃)₃
NCCH₂CH₂Si(OCH₃)₃

These organotrialkoxysilanes are suitably described by Berridge in U.S. Pat. No. 2,184,555, assigned to the same assignee as the present invention.

Illustrative of useful organotriacyloxysilane crosslinking agents for use with the subject invention are the following:

CH₃Si(OCO(CH₂)₄CH₃)₃
Si(OCO(CH₂)₄CH₃)₄

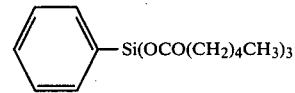

CH₃(CH₂)₆CH₂Si(OCO(CH₂)₄CH₃)₃
CF₃(CH₂)₃Si(OCO(CH₂)₄CH₃)₃

-continued
NCCH$_2$CH$_2$Si(OCO(CH$_2$)$_4$CH$_3$)$_3$
CH$_3$Si(OCOCH(C$_2$H$_5$)(CH$_2$)CH$_3$)$_3$

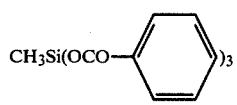

These silanes are also well known in the art and can be made by techniques disclosed, for example, in Beers, U.S. Pat. No. 3,382,205, assigned to the same assignee as the subject invention.

Preferably in crosslinking agent (b) m has a value of 1 and the preferred silanes for use in the invention are methyltrimethoxy silane, methyl tris-(2-ethylhexanoxy)silane and methyl tris(benzoxy) silane.

Catalyst component (c) may be any catalyst known to be useful for promoting the reactions between the silanol chain-stopped diorganopolysiloxane component (a) and the hydroxy-reactive silane component (b). Generally, these are metal esters and the types of metals can vary broadly, so long as silicon is not included because of the need to provide a selectively hydrolyzable Si-O-M bond. Preferably, the metal will be selected from lead, tin, zirconium, antimony, iron, cadmium, barium, calcium, titanium, bismuth, manganese, zinc, chromium, cobalt, nickel, aluminum, gallium, or germanium. Generally, these will be metal esters such as dibutyltin diacetate, dibutyltin dibenzoate, dibutyltin adipate, lead octoate, tin rincinoleate, aluminum acetylacetonate, dioctyltin monoacetate, dialkyltin acrylates generally, as well as metal chelates. Illustrative of titanium chelate catalysts known to be useful in curing room temperature vulcanizable silicone rubber compositions are:

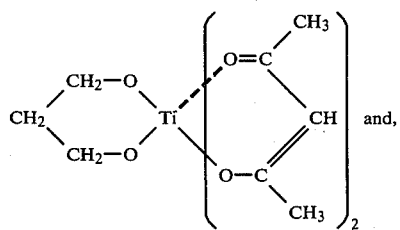

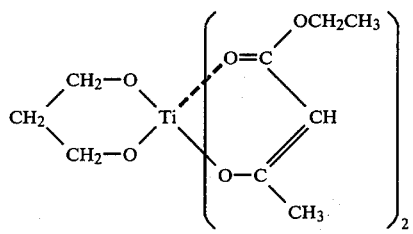

The catalyst (c) is generally present in amounts of between 0.01 and 10.0 parts by weight per 100 parts by weight of component (a), and preferably between 0.02 and 5 parts by weight. Especially preferably, from about 0.05 to about 0.15 parts by weight catalyst will be used for each 100 parts by weight of the overall composition, and the weight ratio of the catalyst to the crosslinking silane will always be at least 0.5 to 1.

The adhesion promoter component (d) of the subject invention is a composition comprising predominantly at least one compound of the formula:

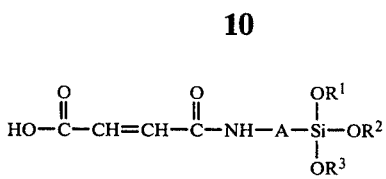

wherein A is divalent alkylene of from 2 to 6 carbon atoms, and $R^1$, $R^2$ and $R^3$ are, independently, $C_1$-$C_6$ alkyl or $C_2$-$C_6$ alkanoyl. The adhesion promoting compounds are prepared by reacting the corresponding aminoalkenyltrialkoxy- or acyloxy-silane with approximately a 50% by weight solution of maleic anhydride dissolved in a lower $C_1$-$C_4$ alkyl alcohol with gentle heating. The adhesion promoter may be conveniently added in this solution form.

Of the adhesion promoting compounds defined above, maleamidylpropyltriethoxysilane,

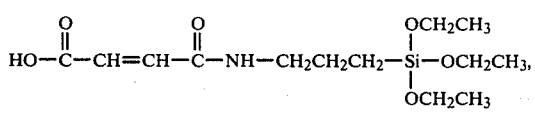

is preferred.

Although maleamidylpropyltriethoxysilane is preferred, many other adhesion promoting silanes defined by the formula above may also be used, for example, maleamidylethyltriethoxysilane, maleamidylbutyltriethoxysilane, maleamidylpentyltriethoxysilane, maleamidylhexyltriethoxysilane, maleamidylpropyltrimethoxysilane, maleamidylpropyltripropoxysilane, and maleamidylpropyltributoxysilane may also be employed, to name but a few. In addition, mixtures of two or more of the above-defined adhesion promoter compounds may be incorporated into the new and improved RTV silicone compositions of the subject invention.

The selected adhesion promoter or promoters of the subject invention need only be added in small effective amounts and may generally range from about 0.1 to about 15% by weight based on the weight of the siloxane base polymer present. In preferred embodiments the adhesion promoter composition will be present at between 0.02 to 2 parts of adhesion promoter per hundred parts by weight of component (a). Higher concentrations of adhesion promoter tend to retard the curing of the room temperature vulcanizable silicone composition, so when a fast cure is desired, two parts of adhesion promoter per 100 parts of the silanol chain-stopped polydiorganosiloxane should generally be regarded as a maximum.

In addition to the components outlined above, the compositions in accordance with the subject invention may be modified by the incorporation of various extenders or fillers. Illustrative of the many fillers which can be employed with the compositions of the present invention are titanium dioxide, lithopone, zinc oxide, zirconium silicate, silica aerogel, iron dioxide, diatomaceous earth, calcium carbonate, fumed silica, silazane treated silica, precipitated silica, glass fibers, magnesium oxide, chromic oxide, zirconium oxide, aluminum oxide, crushed quartz, calcined clay, asbestos, carbon, graphite, cork, cotton, synthetic fibers, etc. Among the most useful fillers are calcium carbonate alone, or mixed with fumed silica. Organosilicone- or silazane-treated silica fillers, such as those described in Lucas, U.S. Pat. No. 2,938,009; Lichtenwalner, U.S. Pat. No. 3,004,859; and Smith, U.S. Pat. No. 3,635,743, are also particularly suitable for use in the RTV compositions of the present invention. The fillers are generally employed in amounts from about 5 to about 700 parts, and preferably, from 10 to about 100 parts by weight per 100 parts of the silanol chain-stopped polydiorganosiloxane component (a).

In addition to fillers preferred compositions can also include a thixotrope or viscosity depressant in the form of from 0.3 to 20 parts by weight of a low molecular weight linear polydiorganosiloxane. A preferred class of such viscosity depressants are compounds of the formula:

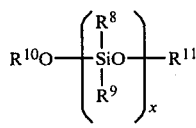

wherein $R^8$ and $R^9$ are each organic radicals of up to 8 carbon atoms selected from hydrocarbyl, halohydrocarbyl and cyano lower alkyl, $R^{10}$ and $R^{11}$ are, independently, hydrogen or radicals as defined for $R^8$ and $R^9$ and x has a value of from 2 to 46.

The most preferred such thixotropes are those of the above formula wherein, in the viscosity depressant, $R^{10}$ and $R^{11}$ are methyl, $R^8$ and $R^9$ are methyl or methyl and phenyl in a ratio of about 70:30, and x is an integer of from 3 to 50.

Additional conventional ingredients can also be included, such as flame retardants, stabilizing agents, pigments, reinforcements, and the like, all added in their conventional amounts.

The compositions of the subject invention are prepared by admixing at room temperature the catalyst, adhesion promoter and the silane with the silanol chain-stopped polydiorganosiloxane and other ingredients under anhydrous conditions. Since the silanes tend to hydrolyze upon contact with moisture, care should be exercised to exclude moisture during the addition of the silane to the polydiorganosiloxane. Likewise, care should be taken that the mixture of silane, adhesion promoter, catalyst and the silanol chain-stopped polydiorganosiloxane is maintained under substantially anhydrous conditions if it is desired to store the admixture for an extended period of time prior to conversion of the composition to the cured solid elastic silicone rubber state. On the other hand, if it is desired to permit the mixture to cure immediately upon admixture of silane, adhesion promoter, catalyst and the polydiorganosiloxane, no special precautions are necessary and the components can be mixed and placed in the form or shape in which it is desired for the composition to be cured upon exposure to moisture.

The amount of silane crosslinker added to the silanol chain-stopped polydiorganosiloxane can vary within wide limits. Satisfactory curing can be obtained, for example, with from 1.0 to 10 moles of the silane per mole of the silanol groups in the polsiloxane. No particular detriment is encountered when using more of the silane per mole of the polydiorganosiloxane, except for a more resinous product being formed and slowing down the cure. The temperature at which the silane crosslinker and the silanol chain-stopped polydiorganosiloxane are admixed is not critical and a room temperature addition, e.g., from 18° to 25° C. is usually employed.

Although the order of the addition of the components of the subject compositions is generally not critical, for ease of manufacturing it is often most convenient to form a base blend of all of the components except the silane crosslinker, adhesion promoter and catalyst. The moisture from the base blend may be removed, for example, by maintaining it under vaccum at elevated temperatures of 50° to 100° C., and thereafter to add the silane, catalyst and adhesion promoter, just prior to packaging in containers from moisture.

The compositions of this invention are stable in the absence of moisture. Consequently, they can be stored for prolonged periods of time without deleterious effect. During this period of storage, no significant change occurs in the physical properties of the room temperature vulcanizing compositions. This is especially advantageous commercially because it insures that once the composition is prepared with a given consistency and cure time, neither change significantly during storage. The compositions of the subject invention are thus extremely valuable and well-suited for one-package systems.

The compositions prepared by mixing the catalyst, silane and adhesion promoter with the silanol chain-stopped polydiorganosiloxane and other ingredients under anhydrous conditions can be used without further modifications in many sealing, caulking, adhesive and coating applications merely by placing the compositions in the desired location and permitting them to cure upon exposure, even after previous storage for many months, a "skin" will form on the present compositions within a relatively short time, e.g., from 10 minutes to about 8 hours, and they will cure to a rubbery state within from a few hours to several days at room temperatures of about 18° to 25° C.

Formation of the composition can be carried out by mixing the ingredients along or with conventional fillers, additives, and the like. In certain cases, an inert solvent can be used, i.e., one which will not react with the silanol or alkoxy groups on the silicon. Suitable solvents include hydrocarbons, such as benzene, toluene, xylene, or petroleum ethers; halogenated solvents such as perchloroethylene or chlorobenzene and organic ethers such as diethylether and dibutylether; ketones such as methylisobutylketone and fluid hydroxyl-free polysiloxanes. The presence of a solvent is particularly advantageous when the silanol chain-stopped polydiorganosiloxane component (a) is a high molecular weight gum. The solvent reduces the overall viscosity of the composition and facilitates cure. The RTV compositions may be kept in the solvent until they are used. This is particularly valuable when a gummy composition is to be employed in coating applications.

The new and improved room temperature vulcanizable silicone compositions of the subject invention are particularly suitable for caulking and sealing applications where excellent adhesion to a variety of substrates is important. For example, the compositions are useful in household and industrial caulking and sealing in building, factories, transportation vehicles, and the like and with substrates such as masonry, glass, ceramics, plastics, metal, wood, and the like. The compositions are also advantageous in having excellent rates of application, making them readily suitable for application from conventional caulkers under standard conditions.

In order that those skilled in the art may more fully understand and practice the subject invention, the following Examples are provided to further describe the new and improved compositions and should not be construded as limiting the invention.

DETAILED DESCRIPTION OF THE PREFERRED EMBODIMENTS

EXAMPLE 1

In the following example, the terms M, D, T and Q are art-recognized designations for, respectively, M=monofunctional organosiloxane unit, $R_3 SiO_{1/2}$;
D=difunctional organosiloxane unit, $R_2 SiO_{2/2}$;
T=trifunctional organosiloxane unit, $R SiO_{3/2}$; and
Q=tetrafunctional organosiloxane unit $SiO_{4/2}$.

A base compound was prepared by mixing in order in a one gallon Baker-Perkins Change Can mixer the following:

| COMPONENT | PARTS BY WEIGHT |
|---|---|
| (a) silanol-terminated polydimethylsiloxane (6,000 cps viscosity at 25° C.) | 1353 |
| (b) a M, D, T, OH silicone oil containing approximately 4 mole % trimethylsiloxy, 56 mole % dimethylsiloxy; 40 mole % methylsiloxy groups and 0.5 weight % OH | 134 |
| (c) lower-silanol fluid | 74 |
| (d) dimethylsiloxane-treated fumed silica having a surface area of approximately 200 m²/g | 190 |
| (e) calcium carbonate | 1900 |
| (f) off white pigment combination | 85 |
| (g) methyl-stopped silicone oil with high silanol content 1100 cps at 25° C. | 595 |

The above ingredients were blended with stirring at atmospheric pressure until the fillers were completely wetted. When the fillers had been wetted, a vacuum of 15 torr was applied and the mixing process was continued for a period of one hour. Thereafter 595 grams of polydimethylsiloxane was added and the base compound was mixed again under 15 torr pressure for approximately 15 minutes.

A catalyst mixture was prepared by admixing the following:

| CATALYST A | |
|---|---|
| COMPONENT | PARTS BY WEIGHT |
| methyltrimethoxysilane | 30 |
| dibutyltin diacetate | 36 |
| maleamidylpropyltriethoxysilane | 30 |

A second catalyst mixture was prepared as a control by admixing the following:

| CATALYST B | |
|---|---|
| COMPONENT | PARTS BY WEIGHT |
| methyltrimethoxysilane | 30 |
| dibutyltin diacetate | 36 |
| 1,3,5,-tris-trimethoxysilyl-propylisocyanurate | 15 |

Two moisture curable room temperature vulcanizing silicone compositions were prepared by adding each catalyst mixture to 1000 grams of the base, compound, respectively, in a Semco Catalyzer and the resulting products were stored in a Semco tubes for a period of three days. The two room temperature vulcanizing silicone compositions had the following formulations:

| EXAMPLES COMPONENT (pbw) | 1* | A** |
|---|---|---|
| base compound | 1000 | 1000 |
| catalyst A | 47.4 | — |
| catalyst B | — | 40 |

*within the scope of this invention
**within the scope of the prior art

After a period of three days molded slabs were prepared by spreading the silicone compositions in rectangular 6"×6"×0.070" molds. The molded slabs were exposed to atmospheric moisture and allowed to cure at 72°±2° F. and 50±5% relative humidity for three days.

Die cut dumbbell test specimens, ¼" wide in the center portion were then evaluated for physical properties in accordance with standard testing procedures. The test specimens were evaluated for Shore A hardness in accordance with ASTM D2240-75 by impacting the surface of the test strip with a conically shaped indentor provided with a known force by a durometer spring. The depth of indentation or penetration of the indentor is inversely related to the hardness of the test strip. The depth of indentation is measured and the value is assigned to an artificial hardness scale of from 0 to 100; 0 being equivalent to full penetration and 100 being equal to no penetration.

The test specimens were also tested for tensile strength and percent elongation, in accordance with ASTM D 412-80. This testing procedure involves placing the opposed ends of the test specimen within the grips of a testing machine designed to apply a constant force on the test strips by outward movement of the grips in opposed directions. Prior to stress testing, two bench marks of measured separation are placed on the test specimen. The testing machine is activated and the sample is stretched until a break occurs. The tensile strength of the sample is equal to the force required to break the test strip divided by the area of the test specimen and is expressed in pounds per square inch. The tensile elongation, percent, is a measure of tolerance to stretching and is derived from the formula:

$$\text{Elongation}, \% = [(L-L_o)/L] \times 100$$

wherein,
L=the observed distance between the bench marks on the stretched test specimen at break, and
$L_o$=the original distance between the bench marks.

The test specimens are also evaluated for peel adhesion under ASTM C794-75. For purposes of this evaluation substrates of stainless steel and of polymethylmethacrylate were used. In accordance with this testing procedure, a thin layer of the composition is placed on the substrate. A cloth or wire mesh imbedded with the composition is placed on top of the coated substrate and a second thin layer of the composition is spread over the cloth or mesh and the entire assembly allowed to cure. The peel adhesion of the composition was tested by peeling back the cloth or mesh at 180° and the force required to break the adhesive bond between the cloth and sealant was measured. Also measured was the percentage of the substrate which was still covered with the cured composition. Ideally, the entire surface of the strip is coated with the cured silicone composition and 100% of the failure is of the cohesive type. If only a portion of the test patch was still covered, the percentage covered was recorded as a measure of the cohesive failure. In other words, 100% cohesive failure indicates superior adhesion between the composition and the substrate, 0% cohesive failure indicates that the composition bonds to itself preferentially over bonding to the substrate.

The compositions of Examples 1 and A were evaluated for physical properties by testing two batches of each composition and the results obtained are shown in Table I as follows:

TABLE I
PHYSICAL PROPERTIES

| PROPERTY | EXAMPLES 1 | A |
|---|---|---|
| Shore A Hardness | | |
| Trial 1 | 25 | 27 |
| Trial 2 | 25 | 28 |
| Tensile Strength, psi | | |
| Trial 1 | 220 | 225 |
| | 217 | 234 |
| | 221 | 226 |
| Trial 2 | 205 | 225 |
| | 214 | 208 |
| | 220 | 214 |
| Elongation, % | | |
| Trial 1 | 860 | 760 |
| | 800 | 800 |
| | 890 | 760 |
| Trial 2 | 900 | 770 |
| | 860 | 720 |
| | 860 | 750 |
| PEEL ADHESION, psi Stainless Steel Substrate | | |
| Trial 1 | 60 | 48 |
| | 61 | 48 |
| | 62 | 48 |
| | 62 | 49 |
| Cohesive failure | 100% | 100% |
| Trial 2 | 69 | 56 |
| | 65 | 53 |
| | 62 | 52 |
| | 66 | 54 |
| Cohesive failure | 100% | 100% |
| PEEL ADHESION, psi Polymethylmethacrylate Substrate | | |
| Trial 1 | 64 | 44 |
| | 66 | 48 |
| | 60 | 51 |
| | 58 | 50 |
| Cohesive failure | 100% | 100% |
| Trial 2 | 58 | 50 |
| | 64 | 50 |
| | 64 | 41 |
| | 56 | 47 |
| Cohesive failure | 100% | 100% |

EXAMPLE 2

If an RTV silicone composition is prepared in accordance with Example 1, with the exception that maleamidylethyltriethoxysilane is substituted as the adhesion promoter in Catalyst A, substantially the same results would be obtained.

EXAMPLE 3

If an RTV silicone composition is prepared in accordance with Example 1, with the exception that maleamidylbutyltriethoxysilane is substituted as the adhesion promoter in Catalyst A, substantially the same results would be obtained.

EXAMPLE 4

If an RTV silicone composition is prepared in accordance with Example 1, with the exception that maleamidylpropyltrimethoxysilane is substituted as the adhesion promoter in Catalyst A, substantially the same results would be obtained.

EXAMPLE 5

If an RTV silicone composition is prepared in accordance with Example 1, with the exception that maleamidylpropyltripropoxysilane is substituted as the adhesion promoter in Catalyst A, substantially the same results would be obtained.

EXAMPLE 6

If an RTV silicone composition is prepared in accordance with Example 1, with the exception that maleamidylpropyltributoxysilane is substituted as the adhesion promoter in Catalyst A, substantially the same results would be obtained.

EXAMPLE 7

A room temperature vulcanizing silicone composition is prepared in accordance with the procedure of Example 1 from the following base compound and catalyst mixture:

| BASE COMPOUND | |
|---|---|
| COMPONENTS | PARTS BY WEIGHT |
| a silanol-terminated polydimethylsiloxane (100,000 cps viscosity at 25° C.) | 100 |
| methyl-stopped silicone oil with high silanol content (100 cps at 25° C.) | 40 |
| methyl-phenyl fluid (5% phenyl) | 5 |
| dimethylsiloxane-treated fumed silica having a surface area of 200m²/gm | 12 |
| calcium carbonate | 120 |
| off-white pigment combination | 5.7 |

The above ingredients are blended with stirring at atmospheric pressure until the fillers are completely wetted. When the fillers are wetted, a vacuum of 15 torr is applied and the mixing process is continued for a period of one hour.

A catalyst mixture is prepared by admixing the following:

| COMPONENTS | PARTS BY WEIGHT |
|---|---|
| methyltrimethoxysilane | 1.5 |
| 1,3-dioxypropanetitanium-bis(acetylacetonate) | 1.8 |
| maleamidylpropyltriethoxysilane | 0.75 |

If a moisture curable room temperature vulcanizing silicone composition is prepared by adding 40 grams of catalyst mixture to 1000 grams of the base compound in a Semco catalyzer, the resulting product when molded, conditioned and tested in accordance with Example 1 would be expected to exhibit very satisfactory adhesion to a variety of substrates.

EXAMPLE 8

An adhesive joint is formed between two workpieces by spreading a composition prepared in accordance with Example 1 on a surface of the first piece and bringing the surface of the second piece into close proximity thereto, thereby forming a sandwich structure adhesive joint with the composition of Example 1 therebetween. If the composition were allowed to cure in the presence of atmospheric moisture at room temperature for a period of three days, it is expected that a strong adhesive joint would be formed which bonds the two workpieces together.

All of the patents, applications and publications cited above are specifically incorporated herein by reference.

Although the subject invention has been described with reference to certain preferred embodiments the new and improved adhesion promoters of the subject invention may be incorporated in any room temperature vulcanizable silicone composition to provide a new and improved moisture curable one package RTV silicone composition within the scope of the present invention. It is apparent that modifications and changes may be made in the compositions of this invention by those skilled in the art. For example, plasticizers, pigments or flame retardants may be added to adapt the compositions to a particular application. Moreover, as has already been mentioned, instead of a maleamidylalkenyltrialkoxysilane adhesion promoter, a maleamidylalkenyltriacyloxysilane adhesion promoter may be used. All such obvious modifications and changes may be made without departing from the scope and spirit of the subject invention as defined by the appended claims.

What is claimed is:

1. A self-bonding, low modulus, one package, room temperature vulcanizing silicone composition, curable by exposure to moisture to a solid elastic state which exhibits superior adhesion to substrates, said composition comprising:
   (a) a silanol chain-stopped diorganopolysiloxane;
   (b) a silane or polysilane crosslinker therefor;
   (c) a catalyst capable of promoting the reactions between (a) and (b); and
   (d) a small, effective, adhesion promoting amount of a composition comprising at least one compound of the formula:

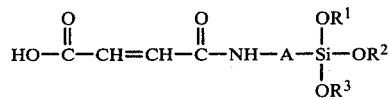

wherein A is a divalent alkylene of from 2 to 6 carbon atoms and $R^1$, $R^2$, and $R^3$ are, independently, $C_1$–$C_6$ alkyl or $C_2$–$C_6$ alkanoyl.

2. A room temperature vulcanizable silicone composition as recited in claim 1 wherein component (a) is a silanol-terminated polydiorganosiloxane having the formula:

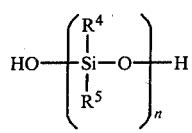

wherein $R^4$ and $R^5$ are each, independently, organic radicals of up to 20 carbon atoms selected from hydrocarbyl, halohydrocarbyl and cyano lower alkyl and n is an average number of from about 10 to 15,000.

3. An RTV silicone composition as recited in claim 2 wherein said silanol-terminated polydiorganosiloxane is a silanol-terminated dimethylpolysiloxane.

4. An RTV silicone composition as recited in claim 1 wherein said silane crosslinker is a silane having the formula:

wherein $R^6$ is an organic radical of up to 8 carbon atoms selected from hydrocarbyl, halohydrocarbyl and cyanoloweralkyl and $R^7$ is an organic radical of from 1 to 30 carbon atoms selected from hydrocarbyl, halohydrocarbyl, hydrocarboyl and halohydrocarboyl and m has a value of 0 to 3 inclusive.

5. An RTV silicone composition as recited in claim 4 wherein said silane crosslinker is selected from the group consisting of methyltrimethoxysilane, methyltris-(2-ethylhexanoxy)silane and methyl-tris-(benzoxy)silane.

6. An RTV silicone composition as recited in claim 1 wherein said catalyst component (c) is a metal ester compound of a metal selected from lead, tin, zirconium, antimony, iron, cadmium, barium, calcium, titanium, bismuth, manganese, zinc, chromium, cobalt, nickel, aluminum, gallium and germanium.

7. An RTV silicone composition as recited in claim 1 wherein said catalyst component (c) is dibutyltin diacetate.

8. An RTV silicone composition as recited in claim 1 wherein said catalyst component (c) is 1,3-dioxypropanetitanium-bis(acetylacetonate).

9. An RTV composition as recited in claim 1 wherein said adhesion promoter component (d) is maleamidylpropyltriethoxysilane.

10. An RTV composition as recited in claim 1 wherein component (a) comprises 100 parts by weight, by weight of the overall composition; component (b) comprises from about 0.01 to about 10 parts by weight of the overall composition; component (c) comprises from about 0.01 to about 10 parts by weight per 100 parts by weight of component (a); and component (d) comprises from about 0.1 to about 15 parts by weight per 100 parts by weight of component (a).

11. An RTV silicone composition as recited in claim 1 which further comprises as component (e) a filler selected from the group consisting of: titanium dioxide, lithopone, zinc oxide, zirconium silicate, silica aerogel, iron dioxide, diatomaceous earth, calcium carbonate, fumed silica, silazane-treated silica, precipitated silica, glass fibers, magnesium oxide, chromic oxide, crushed quartz, calcined clay, asbestos, carbon, graphite, cork, cotton, synthetic fibers and mixtures of any of the foregoing.

12. An RTV silicone composition as recited in claim 10 wherein said filler component (e) comprises from 10 to 700 parts by weight based upon 100 parts by weight of component (a).

13. An RTV silicone composition as recited in claim 1 further comprising an optional additive selected from the group consisting of flame retardants, stabilizing agents, thixotropic agents, pigments and mixtures of any of the foregoing.

14. A self-bonding, moisture curable, one package room temperature vulcanizable silicone composition which in the cured solid elastic state exhibits low tensile strength, high percent elongation and superior adhesion to substrates, said composition comprising:

(a) 100 parts by weight of a silanol chain-stopped polydiorganosiloxane of the formula:

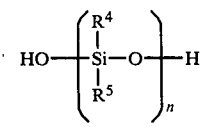

wherein $R^4$ and $R^5$ are each, independently, organic radicals of up to 8 carbon atoms selected from hydrocarbyl, halohydrocarbyl and cyanoloweralkyl and n is an average number of from about 10 to 15,000;

(b) from 0.01 to 5.0 parts by weight of a cross-linking silane of the formula:

$$R^6{}_m Si(OR^7)_{4-m}$$

wherein $R^6$ and $R^7$ have the values defined for $R^4$ and $R^5$ above and m has a value of 0 to 3 and an average value based on the total amount of silane in the composition of 0 to 1.99; and (c) from 0.1 to 10 parts by weight of a silanol-reactive organometallic ester compound of a metal other than silicon, the compound having radicals attached to the metal atom, at least one of said radicals being a hydrocarbonoxy radical or a substituted hydrocarbonoxy radical, said radicals being attached to the metal atoms through M-O-C linkages wherein M is the metal and any remaining valences of the metal are satisfied by substituents selected from organic radicals attached to the metal atoms through M-O-C linkages, —OH, and —O— of a M-O-M linkage, the weight ratio of components (c) to (b) always being greater than 0.5 to 1; and (d) from about 0.2 to 2 parts by weight of an adhesion promoter composition per 100 parts of components (a), said adhesion promoting composition comprising at least one compound of the formula:

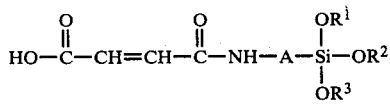

wherein A is a divalent alkylene of from 2 to 6 carbon atoms and $R^1$, $R^2$ and $R^3$ are independently, $C_1$–$C_6$ alkyl or $C_2$–$C_6$ alkanoyl.

15. An RTV silicone composition as recited in claim 14 wherein said adhesion promoter component (d) is maleamidylpropyltriethoxysilane.

16. An RTV silicone composition as recited in claim 14 wherein said silanol-chain stopped polydiorganosiloxane is a silanol-terminated polydimethylsiloxane.

17. An RTV silicone composition as recited in claim 14 wherein said crosslinking silane component (b) is methyltrimethoxysilane.

18. An RTV silicone composition as recited in claim 14 wherein said crosslinking silane is present in amounts of from 0.1 to 0.95 parts by weight.

19. An RTV silicone composition as recited in claim 14 wherein said silanol reactive organometallic ester compound component (c) is an organometallic ester compound of a metal selected from the group consisting of lead, tin, zirconium, antimony, iron, cadmium, barium, calcium, titanium, bismuth, manganese, zinc, chromium, cobalt, nickel, aluminum, gallium and germanium.

20. An RTV composition as recited in claim 14, wherein said organometallic ester compound component (c) is selected from the group consisting of 1,3-dimethyl-1,3-dioxypropanetitanium bis(acetylacetonate), 1-ethoxy-3-methyl-1,3-dioxypropanetitanium bis(acetylacetonate), and mixtures thereof.

21. An RTV silicone composition as recited in claim 14 wherein the weight ratio of components (c) to (b) is greater than unity.

22. An RTV silicone composition as recited in claim 14, further comprising as component (e) a filler selected from the group consisting of calcium carbonate, fumed silica and mixtures thereof.

23. An RTV silicone composition as recited in claim 14 further comprising a component (f) from 0.3 to 20 parts by weight of a thixotrope or viscosity depressant comprising a low molecular weight linear polydiorganosiloxane selected from compounds of the formula:

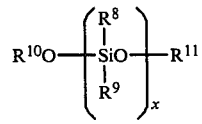

wherein $R^8$ and $R^9$ are each organic radicals of up to 8 carbon atoms selected from hydrocarbyl, halohydrocarbyl and cyanoloweralkyl, $R^{10}$ and $R^{11}$ are independently, hydrogen or radicals as defined for $R^8$ and $R^9$, and X has a value of from 2 to 46.

24. An RTV composition as recited in claim 14 wherein said composition further comprises an additive selected from the group consisting of flame retardants, stabilizers, pigments and mixtures of any of the foregoing.

25. A process for preparing a self-bonding, moisture curable, one package, room temperature vulcanizable silicone composition which in the cured solid elastic state exhibits superior adhesion to substrates, said process comprising:

(a) providing a composition comprising:
  (i) a silanol or chain-stopped diorganopolysiloxane;
  (ii) a silane or polysilane crosslinker therefor; and
  (iii) a catalyst capable of promoting the reactions between (i) and (ii); and (b) adding to said composition a small, effective adhesion promoting amount of a composition comprising at least one compound of the formula:

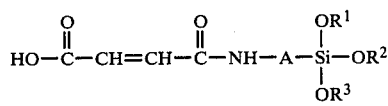

wherein A is a divalent alkylene of from 2 to 6 carbon atoms, and $R^1$, $R^2$ and $R^3$ are, independently, $C_1$–$C_6$ alkanoyl.

26. An article of manufacturing comprising a plurality of pieces, each piece having at least a part of a surface portion in close proximity to another piece, and having an adhesive joint therebetween, said adhesive joint comprising a low modulus, rubbery moisture cured composition comprising:
(a) a silanol chain-stopped diorganopolysiloxane;
(b) a silane or polysilane crosslinker therefor;
(c) a catalyst capable of promoting the reactions between (a) and (b); and
(d) a small, effective, adhesion promoting amount of a composition comprising at least one compound of the formula:

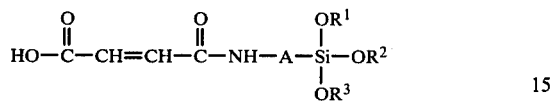

wherein A is divalent alkylene of from 2 to 6 carbon atoms and $R^1$, $R^2$, and $R^3$ are, independently, $C_1$-$C_6$ alkyl or $C_2$-$C_6$ alkanoyl.

27. A method of bonding a plurality of articles comprising:
(a) providing a plurality of articles;
(b) applying a layer of moisture-curable, adhesive joint forming composition to at least a portion of a surface of at least one of the articles;
(c) bringing at least two surfaces of at least two of said articles into proximity so as to complete formation of a moisture curable adhesive joint therebetween; and
(d) exposing the article of step (c) to moisture until the adhesive joint forming composition has cured to a firmly adhered rubbery material, said moisture curable adhesive joint forming composition comprising:
(i) a silanol chain-stopped polydiorganosiloxane;
(ii) a silane or polysilane crosslinker therefor;
(iii) a catalyst capable of promoting the reactions between (i) and (ii); and
(iv) a small, effective, adhesion promoting amount of a composition comprising at least one compound of the formula:

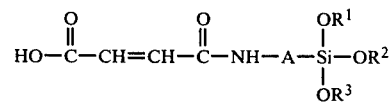

wherein A is divalent alkylene of from 2 to 6 carbon atoms and $R^1$, $R^2$ and $R^3$ are, independently, $C_1$-$C_6$ alkyl or $C_2$-$C_6$ alkanoyl.

* * * * *